United States Patent [19]  [11] 4,252,302
Musgrave  [45] Feb. 24, 1981

[54] ADJUSTABLE-THRUST SPRING ASSEMBLY

[76] Inventor: Daniel D. Musgrave, 8201 Caraway St., Cabin John, Md. 20731

[21] Appl. No.: 40,405
[22] Filed: May 18, 1979
[51] Int. Cl.³ .............................................. F16F 1/18
[52] U.S. Cl. ....................................... 267/165; 42/50
[58] Field of Search ................... 42/50; 267/36 A, 89, 267/158, 160, 164, 165; 74/107

[56] References Cited

U.S. PATENT DOCUMENTS

| | | | |
|---|---|---|---|
| 1,125,946 | 1/1915 | Bovee | 267/158 X |
| 1,250,549 | 12/1917 | Bowman | 267/158 X |
| 3,241,637 | 3/1966 | Temple | 74/107 X |
| 3,275,311 | 9/1966 | Sichel | 267/165 X |
| 3,493,083 | 2/1970 | Lightowler | 74/107 X |
| 3,964,199 | 6/1976 | Musgrave | 42/50 |
| 3,999,319 | 12/1976 | Musgrave | 42/50 |

FOREIGN PATENT DOCUMENTS 204286  7/1939  Switzerland ............................. 267/164

Primary Examiner—George E. A. Halvosa

[57] ABSTRACT

A spring assembly adapted for long-term installation in a limited space, in a minimum-stress condition. When thrust is desired, the assembly is activated by adjusting the position of some components, resulting in a tendency for the assembly to expand.

5 Claims, 10 Drawing Figures

ADJUSTABLE-THRUST SPRING ASSEMBLY

Many types of mechanical equipment include springs which must stand-by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide a spring assembly which can be installed in a minimum space, while in a minimal-stressed condition, and can be adjusted within the same space to a highly-stressed condition.

Another object is to provide a spring assembly having improved means for engaging the parts of said assembly, inter se.

Another object of this invention is to provide such a spring assembly which will be economical to fabricate.

These and other objects of the present invention will become apparent upon reference to the following specification, taken in connection with the accompanying drawings, wherein.

The drawings are not to scale and they do not illustrate any particular magazine. The drawings have been prepared for purposes of disclosure, and they should not be construed as a limitation on the invention. In actual practice, it may be desirable to construct the spring assembly with members having portions differing in configuration from that which is shown.

Figure 1:
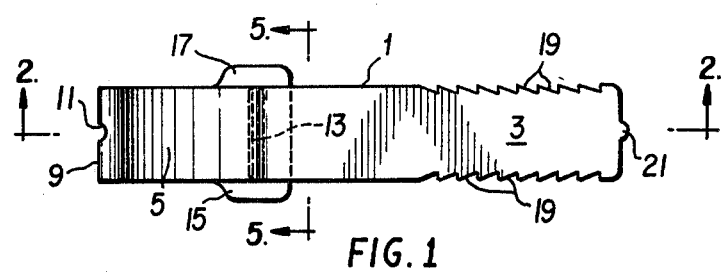
FIG. 1 is a top view of a spring member for use in an adjustable-thrust spring assembly.
Figure 2:
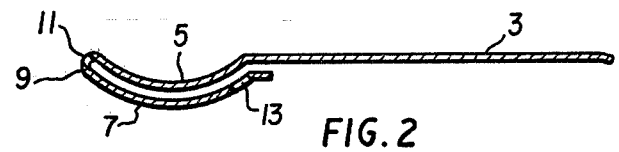
FIG. 2 is a section taken in the plane indicated by line 2—2 on FIG. 1.
Figure 3:
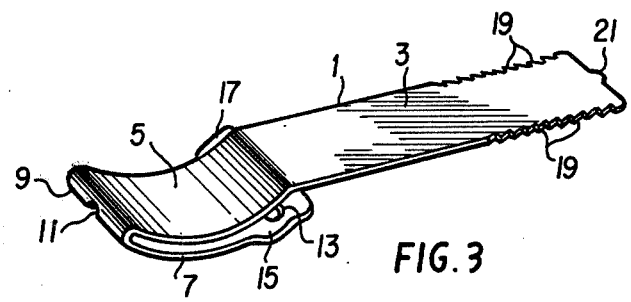
FIG. 3 is a perspective view of the member shown in FIG. 1.
Figure 4:
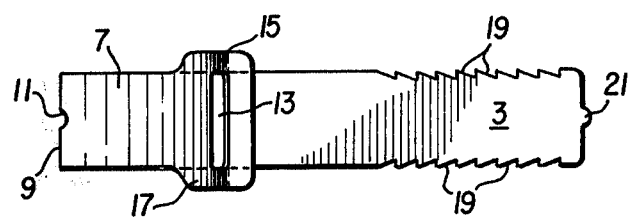
FIG. 4 is a bottom view of the member shown in FIG. 1.
Figure 5:
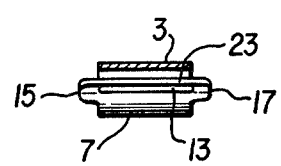
FIG. 5 is a cross-section taken in the plane indicated by line 5—5 on FIG. 1.

Referring to the drawings in detail, FIG. 1 shows a member 1 comprising a folded resilient leaf having a substantially flat portion 3 and a pair of nested arcuate portions 5 and 7. These arcuate portions are joined by a vertex 9, through which is formed a passage 11.

A slot 13 is formed through member 1 near one end of arcuate portion 7. The slot is very slightly greater in length than the width of the flat portion 3, so it is necessary to widen member 1 near the ends of the slot. Ears 15 and 17 are provided for this purpose.

Formed on flat portion 3 is detent means, comprising a plurality of teeth 19 distributed along both edges of that portion. The teeth may be upset or twisted slightly. At the end of the flat portion is a lip 21. The purpose of the detent means and the lip will be explained below.

It will be noted that whereas flat portion 3 extends a substantial distance from arcuate portion 5, there is only a short terminal portion 23 extending from arcuate portion 7.

Figure 6:
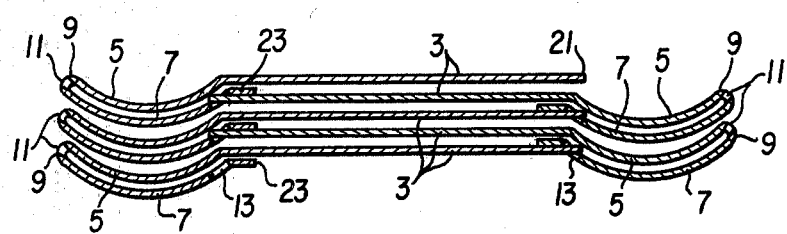
FIG. 6 is a view showing how several spring members can be assembled together while relaxed.

An adjustable-thrust spring assembly comprises a plurality of members 1 which are engaged together as shown in FIG. 6. A flat portion 3 of each member is partly inserted into slot 13 of an adjacent member. Teeth 19 are so shaped and dimensioned that they will permit such insertion, but they will not permit withdrawal.

The spring assembly shown in FIG. 6 is relaxed. A plurality of members can thus be assembled into a close stack. Such a stack is indicated at 25 in FIG. 8. The spring assembly, or stack, can be installed in a relaxed condition in a minimum space, As may be noted in FIG. 6, flat portion 3 of each member is partly inserted into slot 13 of an adjacent member. The use of a slot in this manner permits a reduction in height of the relaxed stack when compared to prior art such as U.S. Pat. No. 3,964,199. In that patent each leaf is engaged with folded flanges on another leaf, thus requiring an additional thickness of material for each member in the stack. Elimination of the additional thickness will significantly reduce the height of the relaxed stack.

Figure 7:
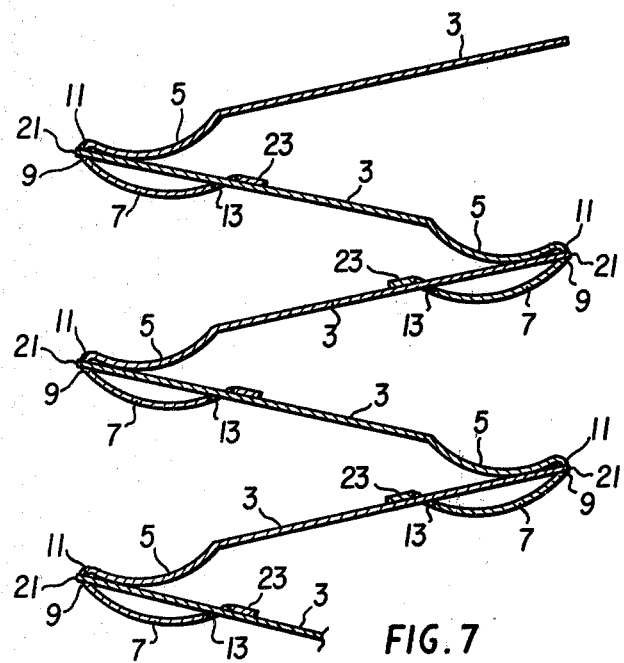
FIG. 7 shows the same members as does FIG. 6, but the members are stressed and the assembly is expanded.

FIG. 7 shows the same plurality of members as does FIG. 6, but they have be re-positioned inter se. Each flat portion 3 has been pushed completely into the slot in which it was engaged so as to contact the inside of vertex 9. This movement permits lip 21 to enter passage 11, while at the same time, successive teeth 19 will engage slot 13. The several members will then form a single assembly capable of expanding as shown in FIG. 7.

Of course FIG. 7 shows the assembly expanded without any resistance or load. In actual practice the re-positioning of the members might take place in a confined space against a load. The end of flat portion 3, acting as a wedge, would separate and distort arcuate portions 5 and 7. If the assembly cannot then expand, the several members will be distorted into complex curves, and will be considerably stressed.

When the several members in an assembly are re-positioned under load, considerable friction will be encountered. It may therefore be desirable to coat the members with a lubricant.

When using certain methods of assembling the members together, it may be convenient to have some, or all of them, magnetized. Of course, there are also methods which cannot be used with magnetized objects.

Figure 8:
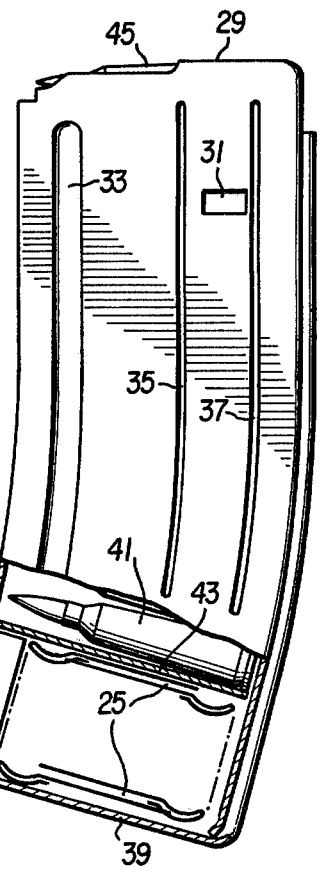
FIG. 8 is a side view, partly sectioned, of a cartridge magazine having an adjustable-thrust spring assembly installed therein.

FIG. 8 shows a cartridge magazine 27 of the well-known type. The magazine has the usual feed lips, one of which is shown at 29. It also has a hole 31 in one side wall wherein is engaged a latching device when the magazine is attached to a firearm. The side wall also has typical stiffening grooves 33, 35, and 37, which need not extend completely to the bottom of the magazine. A floor plate 39 is affixed to the magazine in any convenient manner.

The lower portion of the magazine in FIG. 8 is cut away, exposing a cartridge 41 resting on a follower 43 in the usual manner. Another cartridge 45 is partly visible under feed lip 29. The follower is engaged with an adjustable spring assembly, the extent and location of which are indicated at 25. The spring assembly rests against floor plate 39. The assembly is in the relaxed condition shown in FIG. 6.

The spring assembly does not occupy the entire space between the follower and the floor plate. In the said space, at the front of the magazine is disposed a pusher block 47 having a lug 49 extending out of the magazine through a suitable passage in the front wall. The end of the lug may be enlarged to prevent it from entering the passage.

The spring assembly being in a relaxed condition and the magazine being filled with cartridges, it can remain so for long periods of time without spring fatigue. There will be no significant thrust on the magazine casing, an important consideration when certain materials, such as plastics, are used in the casing.

When it is desired to use the magazine for firing, lug 49 is pushed inward as indicated by the arrow. Block 47 rams half of the members into the other half. The members assume somewhat the relationship shown in FIG. 7, but the assembly cannot expand vertically. It therefore exerts a thrust on follower 43 and a reaction on floor plate 39.

As cartridges are rammed out of the magazine the spring assembly will expand and assume a profile substantially as appears in FIG. 7.

Figure 9:
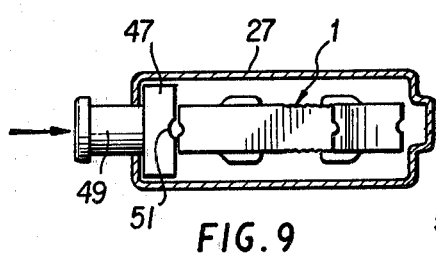
FIG. 9 is a horizontal section of the lower part of the magazine shown in FIG. 8.

In FIG. 9 it will be noted that a groove 51 is formed in block 47 to accommodate lip 21 if it protrudes through vertex 9. At the other end of the stack the lip is accommodated by the shape of the magazine casing. The spring assembly will contact the rear wall of the magazine when pushed by the block.

Figure 10:
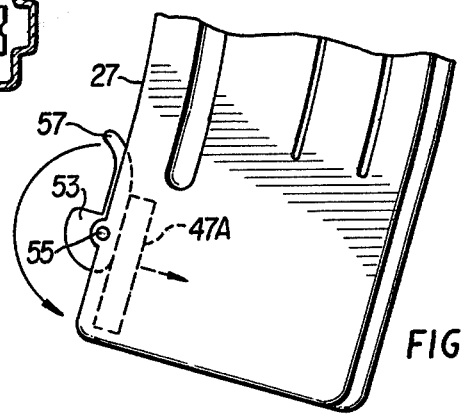
FIG. 10 is an alternate arrangement of the lower part of the magazine shown in FIG. 8.

FIG. 10 shows an alternate construction for moving the members of the assembly. A cam 53 is mounted on a pin 55 which is suitably supported in magazine 27. Affixed to the cam is a lever 57. When the lever is moved around the arc indicated by the curved arrow, the cam will push block 47A against the spring assembly. The assembly will thus be stressed as described hereinbefore.

There is thus disclosed an adjustable-thrust spring assembly which can be installed in a mechanical device in a relaxed condition, and stressed quickly when thrust is desired.

It should be noted that the cross-sectional area of member 1 is reduced at vertex 9 by passage 11. This reduction permits the member to bend easily at the vertex.

What I clam is:

1. An adjustable-thrust spring assembly comprising a stack of interleaved resilient leaf members, each member including: a pair of nested arcuate portions connected by a vertex; a long leaf extending from one of said pair; a short leaf extending from one of said pair; and a slot formed transversely through said member substantially at the junction of said short leaf and one of said pair, said slot in each said member having edge portions engaged with a long leaf of another said member whereby the height of said stack is minimized; each successive said member being installed in said stack in an orientation opposite to an adjacent said member; said stack including means for inserting wedge means between each said pair of arcuate portions thereby separating said pair and tending to expand said assembly in a predetermined direction.

2. An assembly as set forth in claim 1 wherein the resilience of said vertex is less than the resilience of said arcuate portions.

3. An assembly as set forth in claim 1 wherein said slot is slightly greater in length than the width of said long leaf.

4. An assembly as set forth in claim 1 wherein said long leaf is adapted to serve as said wedge.

5. An assembly as set forth in claim 1 and coated with a lubricant.

* * * * *